(12) United States Patent
Valdes et al.

(10) Patent No.: US 7,729,264 B2
(45) Date of Patent: Jun. 1, 2010

(54) SYSTEM METHOD AND SOFTWARE FOR USER CUSTOMIZABLE DEVICE INSERTION

(75) Inventors: Ricardo Luis Valdes, Costa Mesa, CA (US); Thomas Paul Marchi, Costa Mesa, CA (US); Dale Dean Sieg, Costa Mesa, CA (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 1033 days.

(21) Appl. No.: 11/303,261

(22) Filed: Dec. 15, 2005

(65) Prior Publication Data

US 2007/0140130 A1 Jun. 21, 2007

(51) Int. Cl.
*H04L 1/00* (2006.01)
(52) U.S. Cl. .......................... 370/241; 370/249; 370/250
(58) Field of Classification Search ........................ None
See application file for complete search history.

(56) References Cited

U.S. PATENT DOCUMENTS

| | | | | |
|---|---|---|---|---|
| 6,560,205 | B1 * | 5/2003 | Corbett et al. | 370/258 |
| 6,888,800 | B1 * | 5/2005 | Johnson et al. | 370/247 |
| 6,898,184 | B1 * | 5/2005 | Anderson et al. | 370/241 |
| 7,388,843 | B2 * | 6/2008 | Fike et al. | 370/241 |
| 7,492,783 | B2 * | 2/2009 | Chen et al. | 370/424 |
| 2002/0104039 | A1 * | 8/2002 | DeRolf et al. | 714/30 |

* cited by examiner

*Primary Examiner*—Frank Duong
(74) *Attorney, Agent, or Firm*—Morrison & Foerster LLP

(57) ABSTRACT

Disclosed is a system method and software for user customizable device insertion. A new device is to be inserted in a loop based network such as an FC-AL network. The network is facilitated by a dedicated networking element, such as a switch. In order to ensure that the new device does not adversely affect the network, the new device is tested before it is inserted. Several tests are provided and the user is allowed to choose which tests are to be used. Alternatively, the user is allowed to define his/her own tests. The device is inserted into the network only after it has satisfactorily completed the applicable tests.

58 Claims, 13 Drawing Sheets

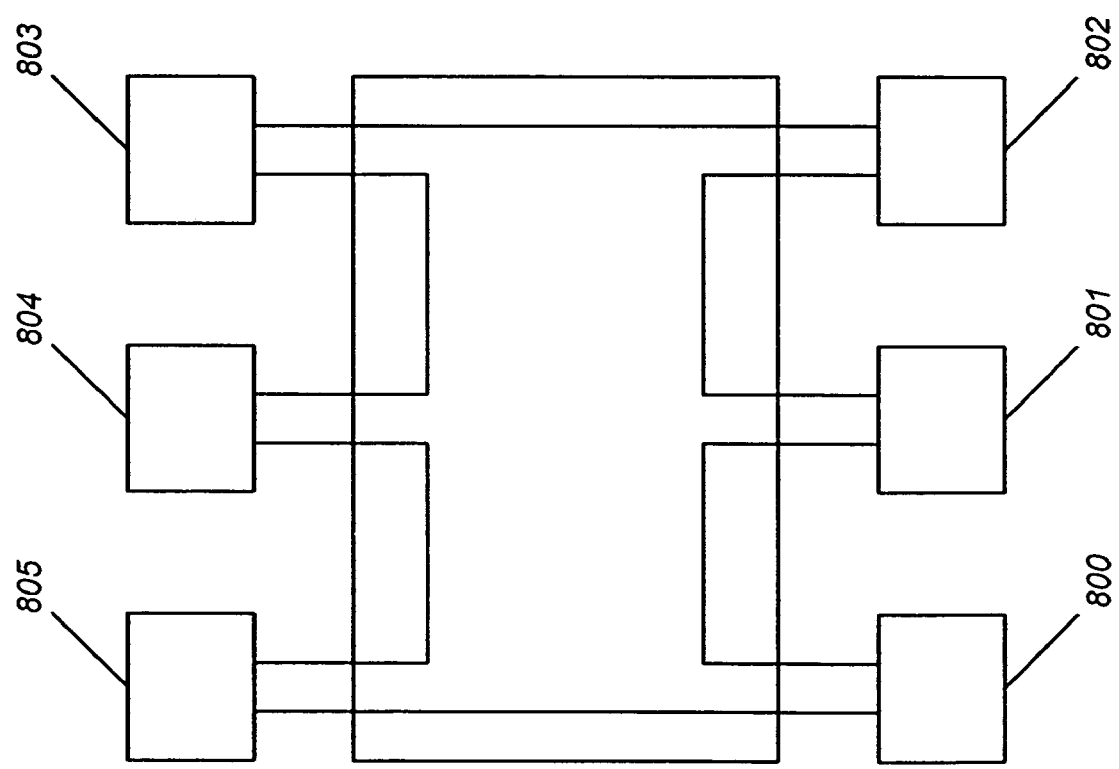

SYSTEM METHOD AND SOFTWARE FOR USER CUSTOMIZABLE DEVICE INSERTION

FIELD OF THE INVENTION

The present invention relates broadly to electronic networks and more narrowly to methods and systems for inserting new devices into electronic networks.

BACKGROUND OF THE INVENTION

Fibre Channel is a well known standard for high speed networks. In various implementations it allows speeds of 1-10 Gbit/s. Fibre Channel is usually implemented on fiber optic cable, but the standard may be used with other suitable transmission mediums, such as, for example, twisted pair copper wires.

Fibre Channel is very suitable for networks that require high data transmission rates as well as low latencies, such as storage area networks (SANs). A SAN is a network that connects various devices (usually file servers and storage devices) for the purpose of storing large amounts of data. Another feature of storage area networks is that they provide low level storage. For example, data in SANs is addressed by block and not by some abstract identifier (such as a file/directory name).

The Fibre Channel standard supports several topologies. A topology is a manner in which devices are connected in a network. The simplest supported topology is Point to Point (FC-P2P) which only allows connecting two devices in a network. Switched Fabric (FC-SW) is a complex Fibre Channel topology which requires that one or more switches connect the various devices. The switches route data packets among the devices so that each packet travels to its destination. Thus, the FC-SW topology is very similar to the topology of a switched Ethernet network, for example. However, due to the high throughput speeds of Fibre Channel, FC-SW switches are usually very expensive, as they have to route high numbers of packets.

An Arbitrated Loop (FC-AL) topology allows for the placement of multiple nodes on a Fibre Channel network without requiring the high costs of FC-SW switches. In an arbitrated loop, the devices of a network are connected to a loop and communicate by passing data along the loop. FIG. 1 is an example of an arbitrated loop. There, the network comprises six devices—A, B, C, D, E and F (100-105). If device A is to send a message to device D, for example, device A sends the message to device B. Device B then forwards the message to device C which forwards it to device D.

In order to operate within an FC-AL network, each device must be specifically designed and configured. For example, each device must be able to follow a common and known protocol in order to obtain an address in the network, to determine what the addresses of the other devices in the network are, to determine which information it receives is to be kept and which is to be forwarded on to the next device in the loop, to determine when it can send information without compromising existing transmissions, etc.

A problem with FC-AL networks is that it is difficult to create innovations for these networks. That is the case because in an FC-AL network there is no dedicated networking equipment which could be improved; instead the networking functionality is placed at the devices. And since the networking functionality requires cooperation from all of the devices according to well established protocols, it is harder to make improvements. Each improvement would probably require modification of the protocols, which would make many existing devices obsolete. This may be compared with the case of a FC-SW topology, where improvements may be easily made to the internal structures of the switches as long as they communicate with other devices according to the established protocols.

To remedy this, many companies offer FC-AL dedicated networking elements, such as switches and hubs. These networking elements usually conserve the loop nature of the network by creating the necessary connections between the devices in order to form a loop or loops, but they may also monitor or create communications along the loop or even reshape the loop itself in order to add additional functionality to the network. An example of such a switch is shown in FIG. 2, wherein the devices of FIG. 1 have been connected in an FC-AL network through a switch 200. The network is very similar to the one shown in FIG. 1, however the connections between the devices 201 pass trough the switch. The switch may offer additional features by monitoring the connections, inserting information into the connections and even reforming the connections. For example, the switch may monitor the connections of device A and upon determining that device A is malfunctioning it may connect device B and F directly, thus removing device A from the network.

Additionally, the switch may initially keep all devices disconnected from the network. If the switch detects that a first device requests to communicate with a second device, the switch would then connect the first and second devices in a two device loop, allowing them to communicate, and disconnect the loop when the communication is complete. Thus, by creating multiple two device loops, the switch can provide performance similar to that of a FC-SW network by using a loop based network. An example of a switch used in FC-AL networks is the SWITCH ON CHIP (SOC) provided by EMULEX.

An important characteristic of an FC-AL network is that each device may be critical for communications even if the communications are not directed to or originated by that device. Referring back to FIG. 1, if A sends a message to D, C is neither the recipient nor the initiator of the message, yet C can easily cause the message to not be delivered, by failing to forward the message to D. This should be distinguished from the FC-SW scenario where each device can usually only disrupt communications to which it is a party.

This characteristic presents a significant problem for the reliability of FC-AL networks. Device failures are not uncommon; thus the ability of one failed device to bring down a whole network is worrying. Usually, a device is tested for failure after being connected to the network. In other words, after a device is connected to a network, other devices (or the switch 200) on the network may determine whether the device behaves as expected and alert a user of a failure, if that is the case. However, a malfunctioning FC-AL device may corrupt communications between other devices before it is determined that the device is malfunctioning and thus before the device can be removed form the network.

A further difficulty is presented by the fact that not all FC-AL networks are the same. And while FC-AL devices should adhere to established protocols, some of them adhere to different versions of a protocol, and some of them adhere to only limited parts of the protocol. Thus, a device may be configured to behave so that it operates perfectly in one FC-AL network, but it may cause failure in another FC-AL network.

For the above reasons, the Fibre Channel industry would greatly benefit from a new method or system for preventing a malfunctioning device from disrupting an FC-AL network.

BRIEF SUMMARY

The present invention comprises a method or system of testing of a device to determine whether the device is suitable for inclusion in a loop network.

In one embodiment, the testing is performed by a network device, such as a switch, connected to the device to be tested. The network device connects the device to be tested to a testing loop which is distinct from the loop network, and performs one or more tests on the device to be tested. Only once the device is determined to have satisfied the testing conditions, the network device connects the device to be tested to the loop network.

In a further development of the above embodiment, the network device is capable of performing several tests and a customer or an administrator of the system has the ability to configure the network device to determine which of the several tests are to be performed.

In another further development, the customer/administrator has the ability to program the network device in order to define his/her own tests.

BRIEF DESCRIPTION OF THE DRAWINGS

FIG. 8B is a diagram of a device in a port inserted state.

DETAILED DESCRIPTION OF VARIOUS EXEMPLARY EMBODIMENTS

The present invention is preferably implemented as a switch or a hub or another similar device that acts as an intermediary in a loop network. While the embodiments described herein are usually directed to an FC-AL network, the present invention may be adapted to other loop or ring based networks, such as, for example, a token ring network.

Figure 1:
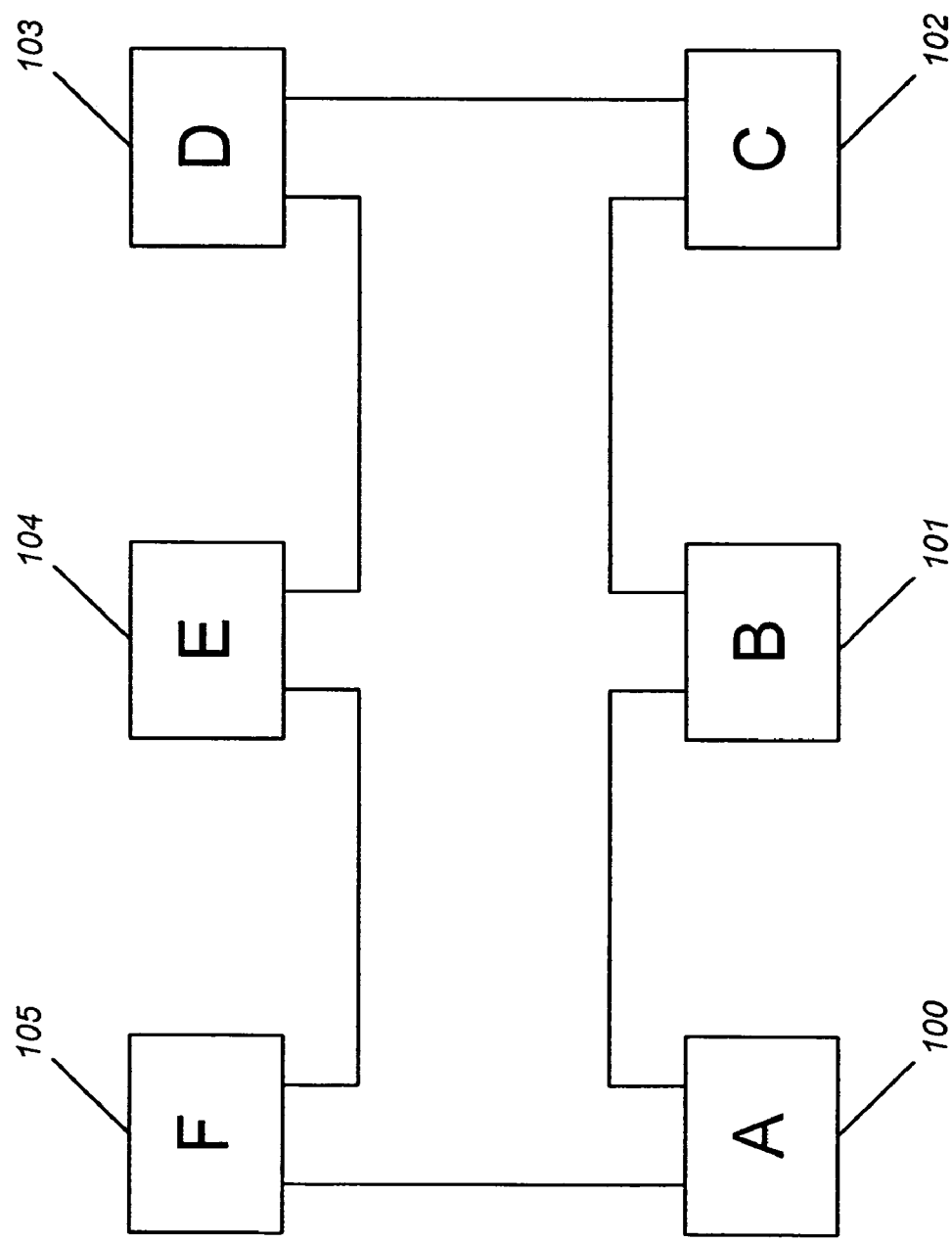
FIG. 1 is a diagram of an FC-AL network.
Figure 2:
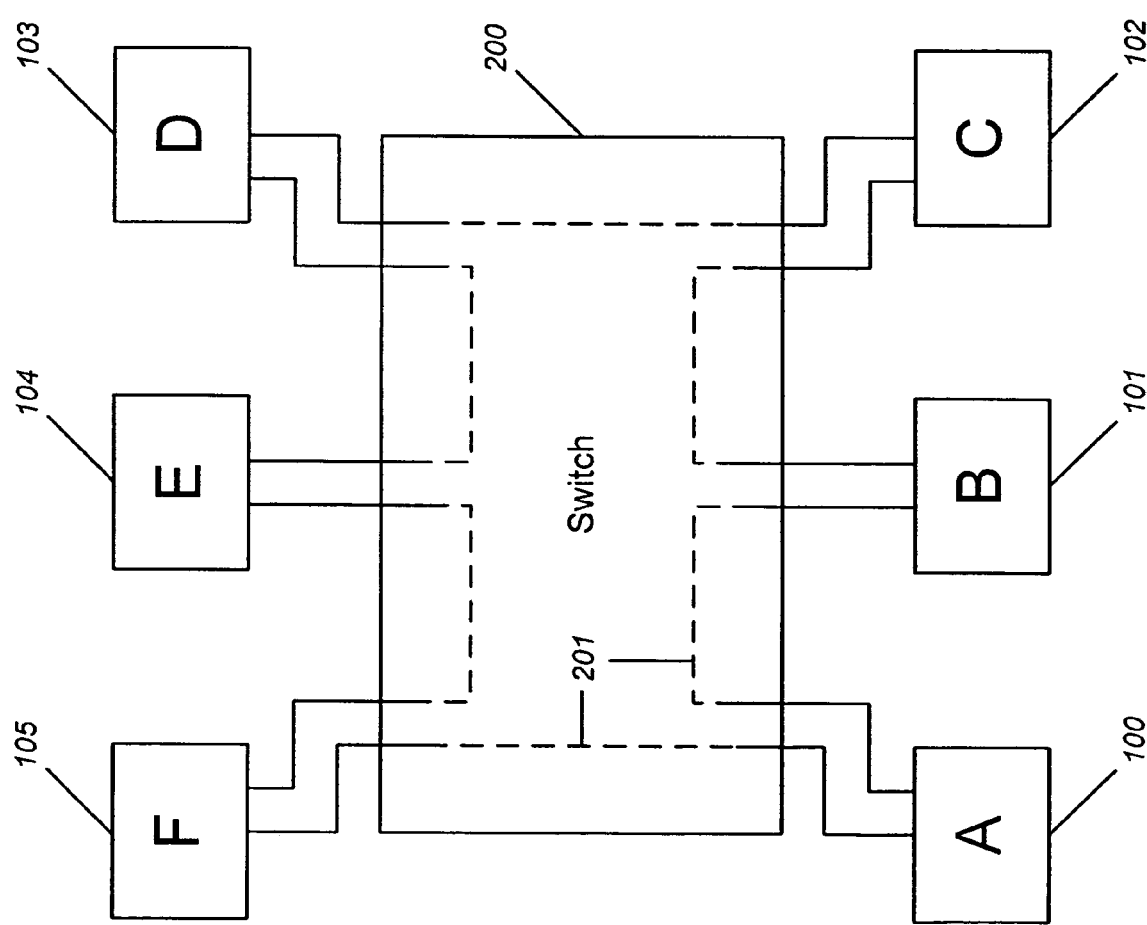
FIG. 2 is a diagram of an FC-AL network connected through a switch.

Thus, for example, the present invention may be implemented at switch 200 of FIG. 2. Switch 200 may have additional functionalities as well, such as the ones described above.

While the present invention may be used in various different types of networks, it provides great benefit in networks that may experience frequent addition and/or removal of nodes and also require that the network's operation is not interrupted during such addition or removal. These are generally referred to as "hot swappable" networks, or networks in which the connected devices are "hot swappable". Furthermore, the present invention provides a great benefit in networks where reliability is highly valued. This is because the present invention helps ensure that a device that is about to be connected to the network is suitable for such a connection and is capable of operating on the network without faults, before the device is actually connected.

An example of a network which often satisfies the above conditions is the SAN discussed above. Storage area networks usually require uninterrupted and reliable operation; however hard drives on these networks often need replacement due to failure, or shortage of storage space.

Figure 3:
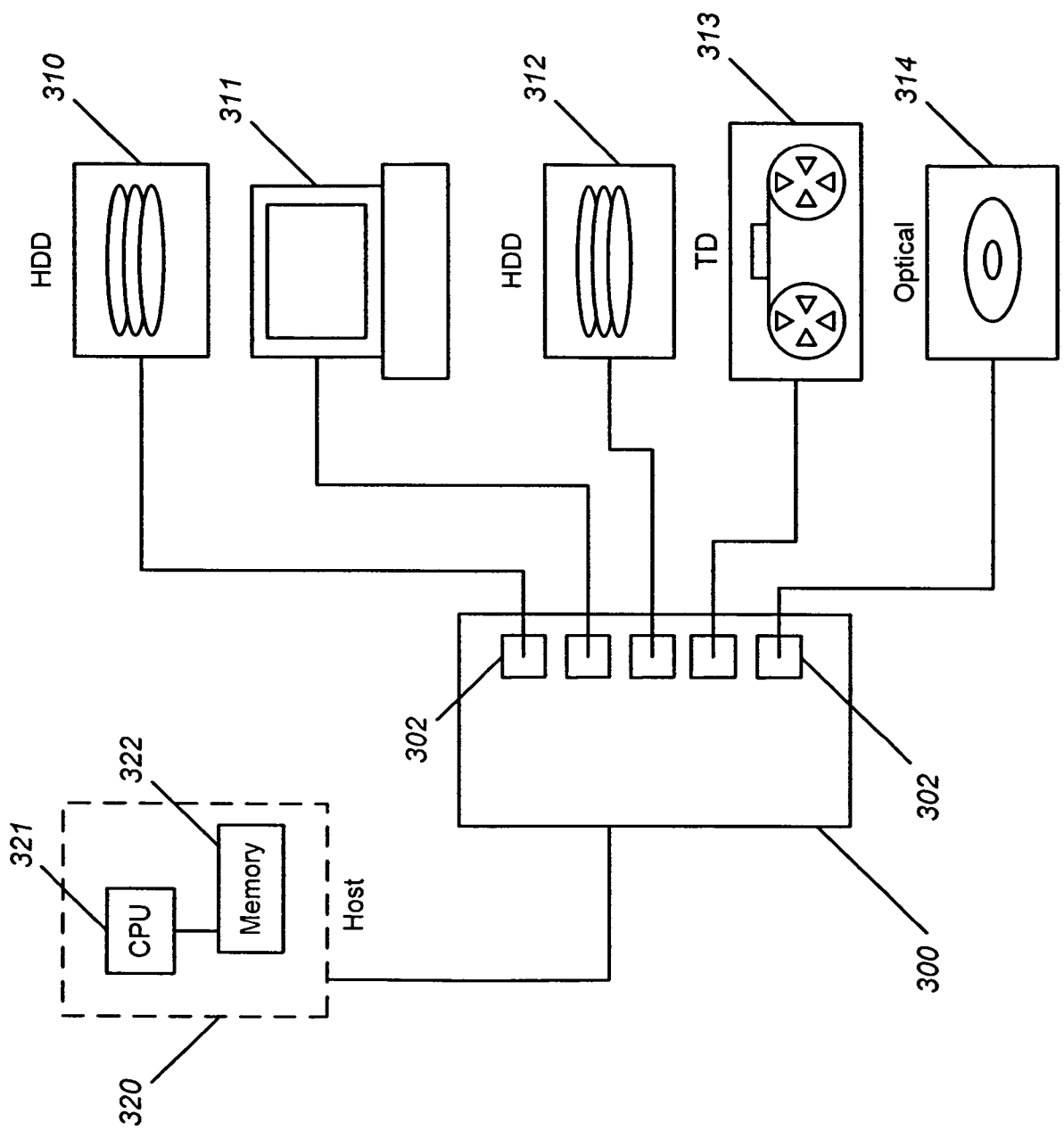
FIG. 3 is a diagram of a storage area network in which the present invention may be implemented.

FIG. 3 shows an example of a storage area network. The network has a FC-AL architecture similar to the one displayed in FIG. 2. However, FIG. 3 is meant to be a less symbolic representation, and thus the loop nature of the network is not as apparent.

A switch 300 comprises various communication ports 302. Switch 300 is similar to switch 200, the major difference being that switch 300 has an embodiment of the present invention implemented on it. Switch 300 may also have other functionalities, as described above in the context of switch 200.

Various computers and devices 310-314 are connected to the switch 300. These may include one or more hard disk drives 310, 312, a computer 311, a tape drive 313, an optical drive, such as a DVD R/W drive 314, and others. One of the connected devices may be another hub or a switch (not shown) which connects the present network to another FC-AL network or to a different type of network, such as the Internet. It should be noted that while FIG. 3 shows each device being connected to the switch through a single port 302, the port may include a plurality of connectors or leads. As shown in FIG. 2 at least two leads should be included for each port in order to realize the loop nature of the network. These may include an input lead and an output lead. The 'input' and 'output' designations need not be permanent as depending on the nature of the network the roles of the leads may change during operation. If the port is parallel, there may be multiple input and output leads.

The network may include any number of various devices and is not limited to the combination of FIG. 3. More specifically, the network may and often does include more than one computer (often referred to as initiators). The computers of a storage area network are usually various types of servers which are connected to clients over other networks. Examples include file servers, back-up servers, database servers, etc. However, computer 311 is not limited to these functionalities.

Devices 310-314 are usually connected to switch 300 in a logical configuration similar to that of FIG. 2. In other words, the devices are connected to each other in a loop, wherein each connection between two devices goes through the switch 300. The switch 300 may however reorganize the connections, and disconnect and reconnect devices.

The features associated with the present invention may be implemented through hardware and/or software. The switch 300 is usually an application specific integrated circuit (ASIC). The switch may be stand alone, i.e. it may have all features implemented on a single ASIC. Alternatively the switch may be connected to a host 320. The host is usually a microcontroller which is connected to the switch and issues various instructions to it and receives various monitoring data from it. A separate host is often used, because it would be cheaper to offload higher level monitoring and control functions to a lower cost general purpose microcontroller rather than implement them on a custom ASIC. The host is not part of the FC-AL network, instead it is directly connected to the switch through a dedicated control port so that it may issue control instructions and receive monitoring data without burdening the FC-AL network.

The host preferably includes a CPU 321 and a memory 322 (which may include a random access memory and/or a read only memory). In operation, the memory includes software used for controlling the switch and that software is executed by the CPU.

Thus, the features of the present inventions are preferably implemented on the switch 300 as well as the host 320. For example, low level features, such as connecting and reconnecting a device to be tested in various manners, sending data to the device, and monitoring the data received from the device are performed by the switch, while the host may receive monitored data from the switch and issue instructions as to what task is to be performed next to the switch.

User customization is an important feature of the preferred embodiments of the present invention. As discussed above, many FC-AL devices operate according to different versions of the FC-AL protocols. Some devices may implement only portions of certain protocols. Since FC-AL networks are usually comparatively small, adherence to established protocols is not as important as it is with larger networks (i.e., the Internet). Thus, as long as all devices operate according to a compatible protocol, and each device implements sufficient part of that protocol in order to be able to execute all functions that will be expected of it, an FC-AL network will be operational. This would be the case even if the protocol the devices implement is not a correct or a complete FC-AL protocol. As a result, in practice there exist a great number of FC-AL networks which effectively operate according to different protocols.

For the above reasons, the switch 300 discussed herein must be able to operate in different types of FC-AL networks and must be able to verify whether a new device is suitable for insertion in different types of networks. It has been determined that presently there is no single practical test which can verify that a device is suitable for insertion in all FC-AL networks in existence today.

For this reason the switch is preferably configured to perform one or more of a plurality of tests, and allow a network administrator to specify which tests are to be performed according to the specific type of network the switch 300 is deployed in. Furthermore, the switch may be configured to allow a network administrator to define his or her own tests.

The customization features are preferably implemented at the host 320. Preferably, the switch 300 is delivered to customer with a software application which is to be executed at the host 320. The host 320 may also be delivered, or alternatively a customer may be directed to provide a host according to certain specifications.

The software application may be provided to the customer in source code form. It includes code which, when executed, directs the switch 300 to perform a plurality of tests. The customer, or a network administrator for the network in which the switch is to be deployed may then modify the source code in order to specify exactly which tests are to be performed, and to specify parameters for the tests to be performed, if specific tests require such parameters. For example, if the code is provided in the C/C++ computer language the customer can easily modify the code by adding and/or removing specific predefined '#define' statements.

The software provided with the switch may comprise a complete application which when executed controls the switch to implement a functioning FC-AL network. Alternatively, the software may comprise a plurality of services, or application program interfaces (APIs) which perform certain specific functions in relation to the switch. The customer would then have to supply his/her own application which uses the provided APIs in order to implement a functioning network.

Additionally, in certain embodiments the customer/network administrator may be able to define his/her own tests. He/she may accomplish that by adding instructions into the source code in a specific predefined manner. The instructions may be in a programming language. Alternatively, in order to reduce complexity, the software may allow the instructions to be added in a simpler language which is specifically created for the purpose of configuring the switch 300. In the latter case, the software must include an interpreter module which will, upon compilation and execution of the software, interpret the instructions and direct the switch to perform a test according to the instructions.

After making the necessary modifications, the customer compiles the source code to obtain software in a form which can be executed at the host 320. The customer then initiates software execution, and the software assumes control of the switch in accordance with the customer's settings.

The above method of configuration is preferred for certain types of customers. For example, it is preferred for a customer who is not an end user of the system but a reseller or a "system integrator", i.e. a person or organization who configures the network, may add additional hardware or features, and sells it to other parties. In this case, allowing the customer to configure the system at the source code level would be beneficial because he/she may ship compiled and configured code to third parties without worries that the third party may cause faults in the system by changing the configuration.

Alternatively, the software may be provided in executable form. In that case, the software includes a setup module which allows the customer to configure the tests to be performed during software execution. The setup module may also allow the user of the software to define his/her own tests.

Additional embodiments may allow other alternative ways to configure the switch. For example, embodiments that do not comprise a host, but provide all functionality at the switch may use switches, such as DIP switches for configuration. Alternatively they may use a memory such as a programmable read only memory (PROM) where configurations and even sets of instructions for user defined tests may be stored.

In operation, a new device which is to be inserted in the network is plugged in into one of the ports 302. However, the device is not immediately inserted in the network. Instead the switch 300 performs one or more tests on it to ensure it is suitable for insertion. The tests are performed in isolation, i.e. the switch does not connect the device to the FC-AL network in any way. After the tests have been completed, the switch 300 connects the new device to the network, and allows it and the other devices on the network to use existing FC-AL protocols to recognize the new device, issue it an address and thus integrate it within the network.

Figure 4:
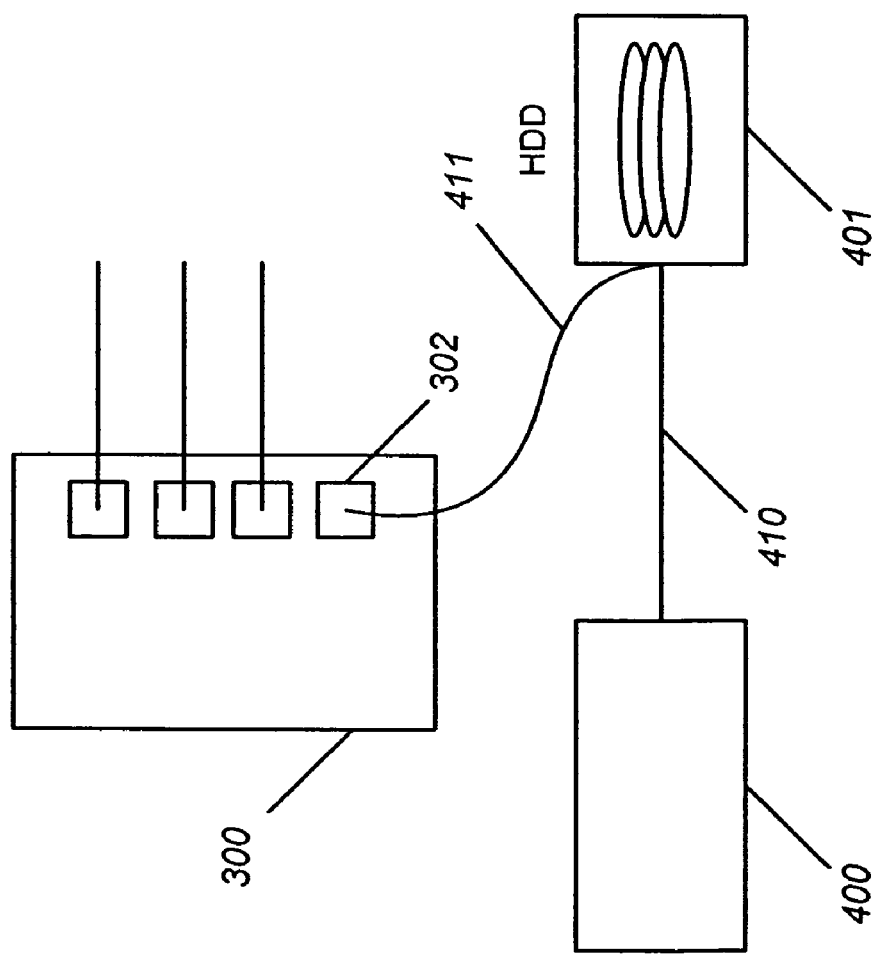
FIG. 4 is a diagram of a standalone device tester.

An alternative embodiment of the present invention is shown in FIG. 4. There the present invention is not implemented at the switch 300 but at a stand alone device tester 400. A device to be tested 401 is plugged into the standalone tester (connection 410). If the test is completed satisfactory, the device is unplugged and plugged into the switch 300 (connection 411), where it is directly added to the network. This embodiment has the disadvantage of requiring some manual plugging and unplugging but it may reduce costs and allow for the present invention to be utilized without having to replace existing switches.

Figure 5:
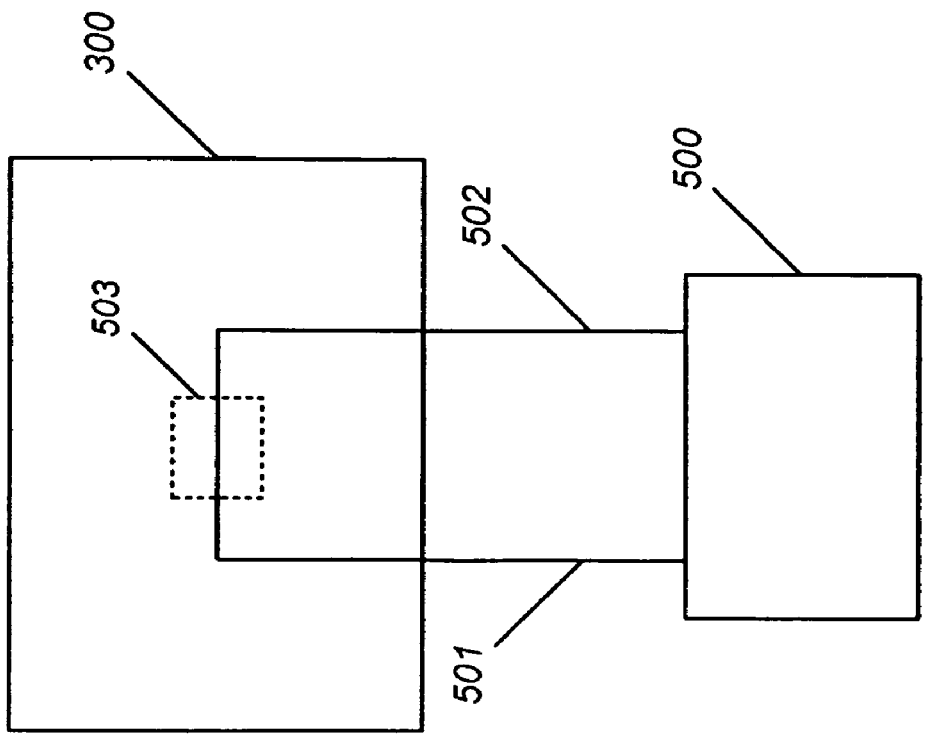
FIG. 5 is a diagram of a device connected in a loopback mode.

As discussed above, when a device is being tested it is isolated from the rest of the network. There are two ways in which a device being tested may be connected to the switch 300. FIG. 5 shows a device which is being tested 500 connected to the switch in loopback mode. Loopback mode signifies the fact that the input (501) and output (502) leads of the device are connected to each other, i.e. looped back. Thus, any signal sent out by device 500 through its output lead 502 will be received through its input lead 501.

However loopback mode does not signify simple short circuiting of the device's ports. Even in loopback mode, the applicable testing procedures require that the switch 300 is able to send data to the device and monitor data sent from the device. Thus, the switch 300 includes one or more monitor and insert circuits 503 which are able to monitor electrical signals traveling along the loop as well as insert data into the loop. The monitor and insert circuits operate without removing any signals from the loop. Furthermore, the monitor and insert circuits perform no functions which would alert the device 500 of their existence. More formally put, the monitor and insert circuits do not perform any functions which would allow the device 500 to detect another device on its loop according to existing FC-AL protocols. Thus, these circuits may be considered to be "invisible" to the device 500 (and are therefore drawn in broken lines).

Figure 6:
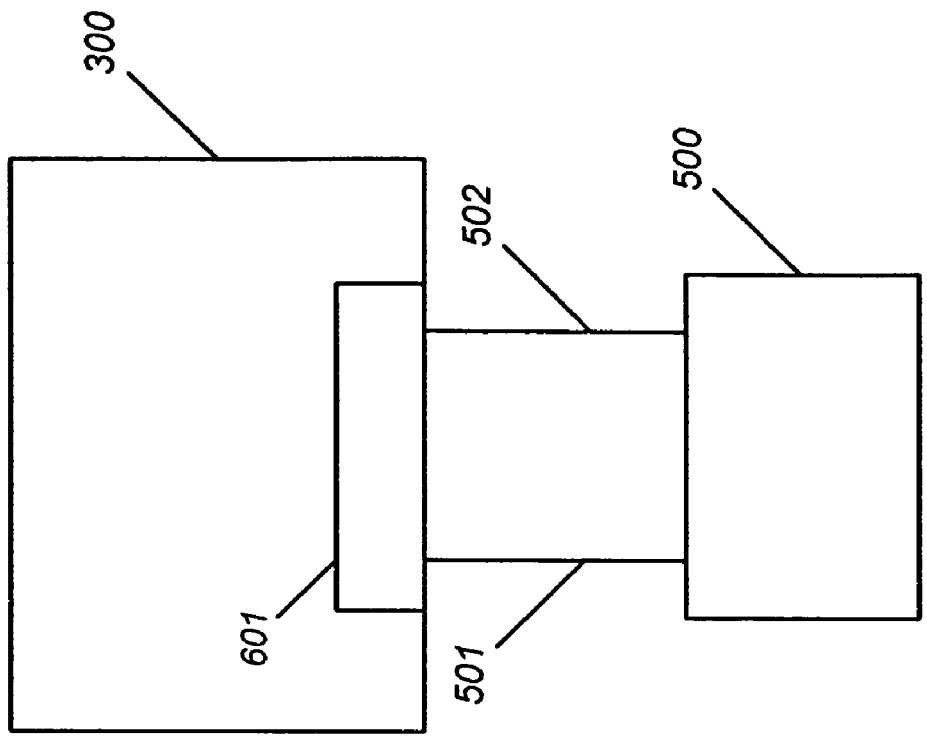
FIG. 6 is a diagram of a device connected in a non-loopback mode.

FIG. 6 shows an alternative mode for connection of the device to be tested—non-loopback mode. There, the connection is terminated at the switch 300 and does not "loop back". In this mode the device leads 501 and 502 are instead connected to terminating monitor and insert circuit 601 which may monitor signals sent by the device or send signals to the device, but does not let signals sent by the device pass back to the device.

Some types of tests require that the device is connected in loopback mode and some require that the device is connected in non-loopback mode. In a preferred embodiment the switch may automatically toggle the mode of connection between loopback and non-loopback depending on the type of test being performed.

Figure 7:
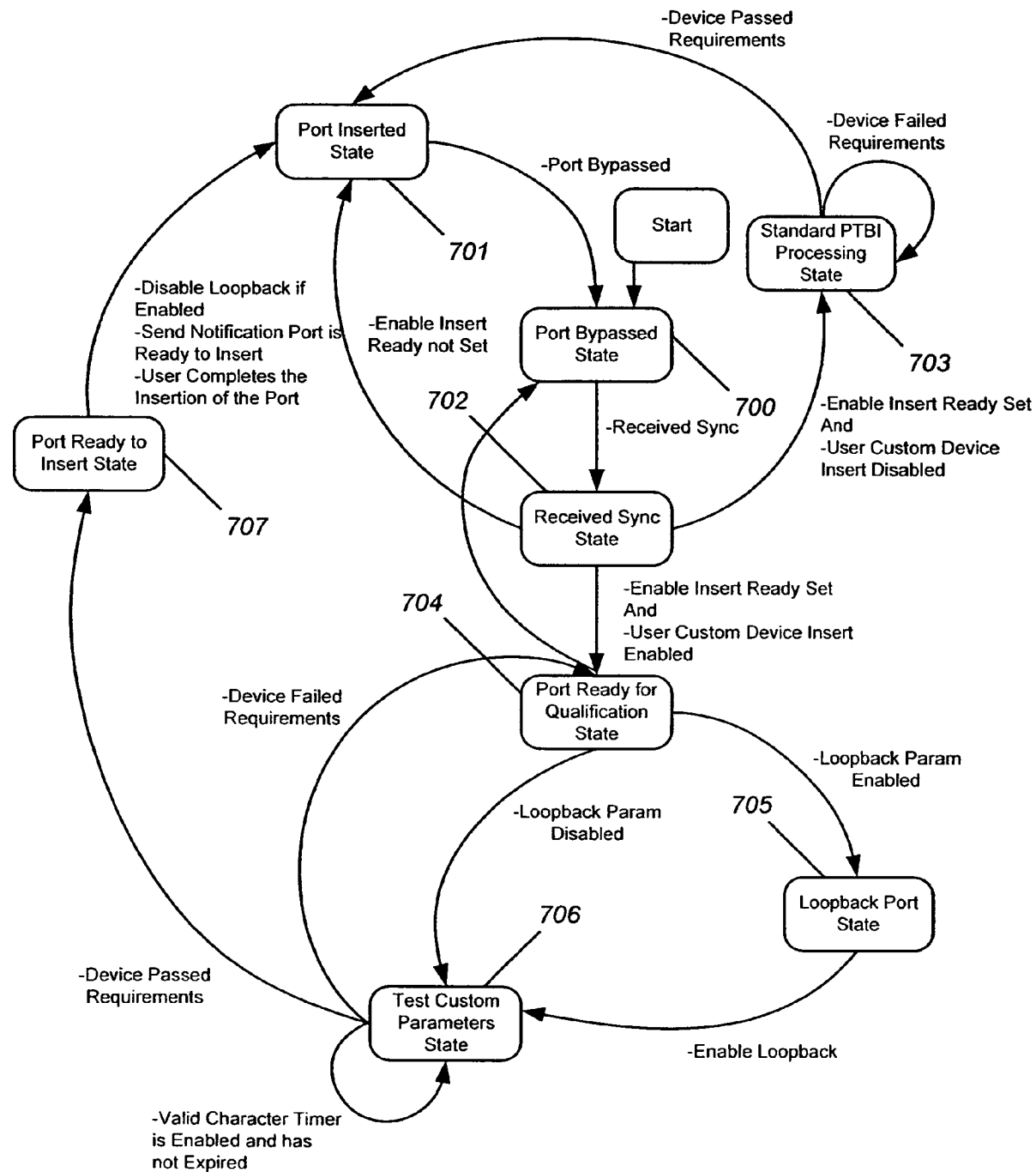
FIG. 7 is a state diagram showing the operation of a switch when testing a device.

FIG. 7 is a state diagram that shows the operation of an exemplary switch when testing a new device. FIG. 7 is not meant to be a complete state diagram; in other words it does not list every possible state. Instead, it is an overview which is sufficient to broadly describe the operations of an exemplary system.

Furthermore, the various states shown in FIG. 7 are states of the switch and not of the device. Thus, when the present description states that certain device is placed in certain state what is meant is that the switch configures its internal circuits so that the device is connected in a certain manner . . . i.e., the state signifies the configuration of the switch, not of the device. For this reason some of the states are referred to by using the term 'port'. This means that the state signifies a state of the switch's or the host's circuitry and/or software (if any) which is used to service that particular port.

Port bypassed state 700 signifies that while one of the ports 302 of the switch 300 may be physically connected to a device, the device is not inserted into the network facilitated by the switch. If the switch facilitates more than one network, then the device is not inserted into any of the networks facilitated by the switch. In other words, the device is not connected to any other device through the switch. Alternatively, port inserted state 701 signifies that a device is connected to the switch and is inserted into the network. Thus, the term "inserted" in FIG. 7 does not signify physical insertion of a device cable into the switch 300, but insertion of the device into a network facilitated by the switch.

Figure 8A:
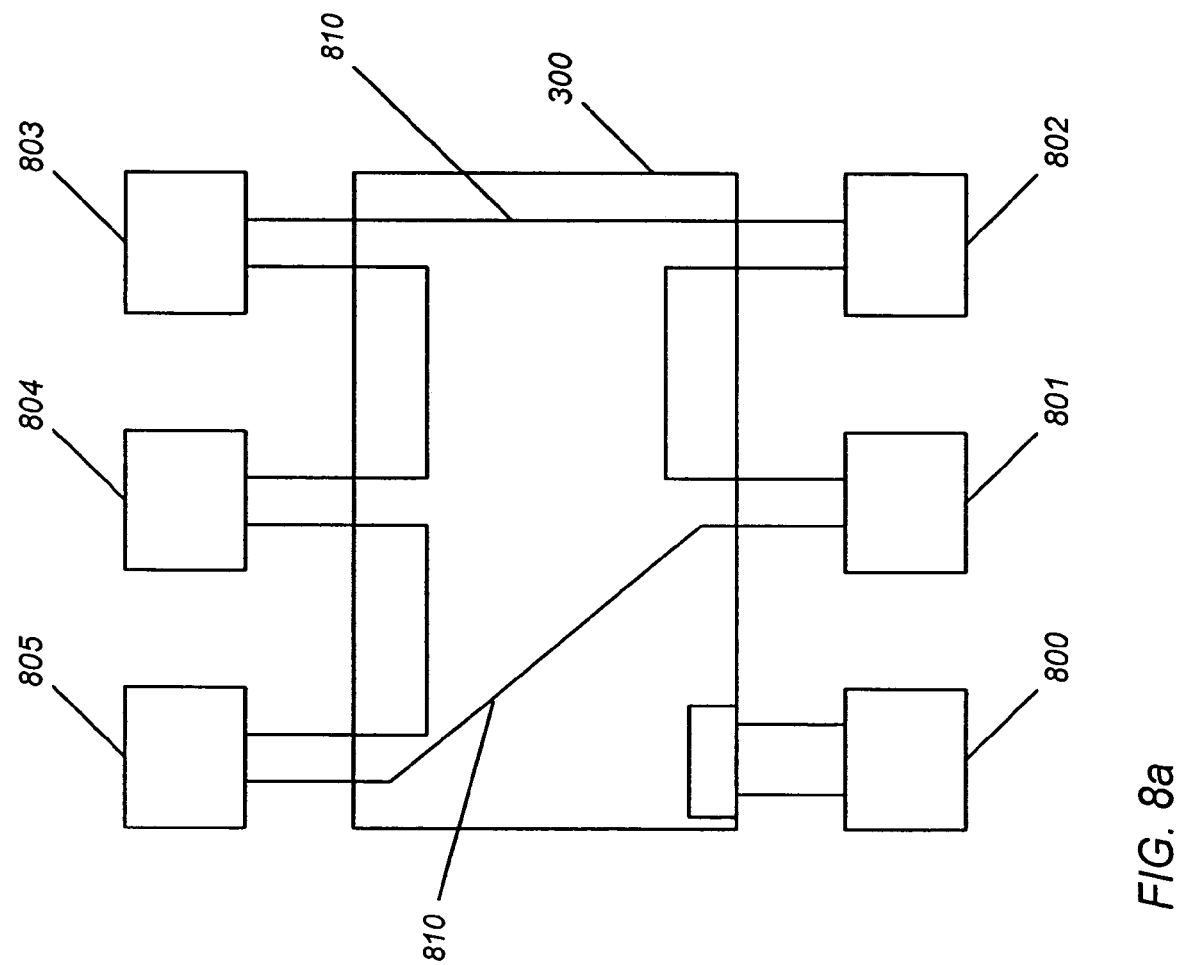
FIG. 8A is a diagram of a device in a port bypassed state.

This distinction is shown in FIGS. 8A and 8B. FIG. 8A shows device 800 connected to switch 300 in a port bypassed state. Note that the device is connected to the switch but is not connected to the other devices through network 810. Alternatively, in FIG. 8B device 800 is connected to the network, i.e. it is in port inserted state.

Referring back to FIG. 7, port bypassed state 700 is usually the state in which each device which has been newly plugged into the switch is placed into. As discussed above, placing a newly connected device in a port bypassed state is beneficial because it allows a new untested device to be isolated from the network before it is tested to ensure it will exhibit proper behavior. Port bypassed state 700 may also reached from port inserted state 701. This may happen when a device which was previously inserted in the network is removed and a new device is inserted. Or it can happen if a device that is inserted in the network fails, and the other devices and/or the switch detect that it operates improperly. Alternatively a user may place a device which has been inserted in the network in port bypassed state using network administration software at the host 320.

The switch 300 monitors the connections of any device in the port bypassed state 700 for a synchronization signal. The synchronization signal is a signal usually emitted by FC-AL devices and its receipt signifies that there is an actual device connected to the port in question and that that device does exhibit some minimal FC-AL functionality. However, this signal is usually not sufficient to signify that the device in question is actually suitable for connection to the network; therefore its receipt is treated as a threshold condition for continuing testing.

Once the switch receives a proper synchronization signal, the received sync state 702 is reached. At this point the exemplary embodiment described in FIG. 7 is programmed to follow one of three choices based on existing configuration settings. The first choice is to connect the device to the network without further testing. If that choice is followed, the device is connected to the network, and the switch thus reaches the port inserted state 701.

The second choice is to test the device in a standard manner. An example of this standard test is port test before insert (PTBI) which is featured on currently available EMULEX SWITCH-ON-CHIP (SOC) fibre channel switches. By default, the PTBI test places the port the newly inserted device is connected to in loop back mode and sends a LIP signal to a newly inserted device. LIP is a signal defined in existing FC-AL protocols which indicates an initialization request. The switch then monitors the device using monitor and insert circuit 503 for signals indicating the Loop State. Again, applicable FC-AL protocols define specific signals that are used to indicate the state of the loop. If the Loop State is indicated as being an "Up" or "Active" state, the test is successful. Then, the device is connected to the network and another LIP signal is sent to the device, and the device is connected to the network.

If that choice is taken, the switch is placed in standard PTBI processing state and it stays in that state while the PTBI test is performed. If the PTBI test were to fail, the switch remains in that state while the test is restarted. If the PTBI test is successful, the switch connects the device to the rest of the network, thus reaching the port inserted state 701.

While undoubtedly useful for many networks, the PTBI test may not be suitable for all devices and all networks. As discussed above, no single test is suitable for all FC-AL networks presently in existence. Therefore, a third option is provided. This is referred to as the user customizable device insertion test (this term is actually used to refer to one or more of several user selectable and/or configurable tests). If the switch is configured to perform the latter test, state 702 is followed by port ready for qualification state 704. State 704 signifies that certain settings which are preliminary to the user customizable device insertion test have been set. These may include, for example, a "user custom device insert" setting.

At state 704 it is determined whether loopback is required. This determination is based upon configuration settings, which may have been made as described above. Specifically, if the switch is configured to perform a test which is known to require loopback, then the switch is placed in the loopback port state 705. Otherwise, the switch is placed in a test custom parameters state 706. If in the loopback port state, the switch enables loopback at the port being tested as shown in FIG. 5 and places itself in the test custom parameters state 706.

A person of skill in the art may note that state 706 actually represents two states: one with loopback enabled, and one with loopback disabled. While this is technically correct, FIG. 7 is not meant to be a mathematically precise state diagram, but merely a state diagram that would help a person of skill in the art better understand the depicted embodiment. Therefore, a single state 706 was used in order to avoid clutter and unnecessary complexities in FIG. 7. However it should be noted that while in state 706 the switch may or may not have loopback enabled at the port being tested.

At state 706 one or more tests included in the user customizable device insert test are performed. The test to be performed and various configuration options for these tests are set or defined using the switch configuration methods described above. The specifics of which tests are to be performed and how, are discussed in more detail below.

If the tests were unsuccessful, the switch returns to the port ready for qualification state 704, where testing is again initiated. The device continues to be tested unless the user indicates that testing should stop or the device is unplugged, or optionally a time out event occurs. If this happens the switch is reset from state 704 back to port bypassed state 700. Then, a new device may be plugged in and tested.

If the device passed the requirements, the port ready to insert state 707 is entered. At this point loopback, if previously enabled, is disabled. Also, the user is optionally alerted that the device has passed the test. Furthermore, the user may also be optionally requested to indicate where he/she wishes the device to be added to the network. In that case, the switch will only enter state 701 after such indication is received.

The switch then connects the device to the network as shown in FIG. 8B. The device then uses existing FC-AL protocols to detect the other devices on the network and allow other devices to detect it. As the device has gone through testing, there is some certainty that the device's protocols will be compatible with the protocols followed by the other devices on the network.

The customizable tests which are performed at state 706 are described in more detail below. As discussed above they preferably include a plurality of tests, the user or administrator being able to select which tests are to be performed and select configuration parameters for some tests if necessary using the configuration options discussed above.

In the preferred embodiment the tests include at least the following:

Valid character timer. Existing FC-AL protocols define a plurality of words which have specific meaning for communication over the network. These words are usually used for network related communication between devices, such as indicating a device's address, requesting access to the network, etc. and are referred to as valid characters. The valid character timer test entails starting a timer and checking whether all data received from the device until the timer expires consists of valid characters. If that is the case the text succeeds; if an invalid character is found the test fails.

Check for invalid TX words. In fibre channel communications 8 bit bytes are transmitted across networks as 10 bits. That is, every 8 bit byte is encoded in a predefined 10 bit pattern and is thus transferred over the fibre channel protocol. Therefore, each possible combination of 8 bits has an associated predefined unique combination of 10 bits for transmission over fibre channel. Since 10 bits define more possible combinations than 8 bits, there are some 10 bit combinations which are not associated with any 8 bit bytes. These are referred to as invalid TX words. This test involves monitoring the device's communications for invalid TX words. If the device sends any such words the test fails, otherwise it succeeds.

Check for cyclic redundancy check errors (CRCs). A cyclic redundancy check is a number transmitted with a block of data in order to detect corruption. The number can be derived from the block of data in a predefined way. By recalculating the cyclic redundancy check from the block of data and comparing it to the value originally transmitted, the receiver can detect some types of transmission errors. This test examines the incoming communications from the device and if they include CRC data it examines that data to determine if there are any CRC errors. If there are errors the test fails.

Transmit an Ordered Set. An ordered set (OS) is a set of one or more valid characters presented in particular order. An ordered set has a specific meaning in the management of an FC-AL network. For example, a specific ordered set as sent from one device may signify a request for all devices to perform a network initialization sequence. Transmitting an ordered set is not a specific test which a particular device can pass or fail, it is a catalyst which may cause the device to send back communications and thus facilitate other tests.

For example, a transmit an ordered set action may be used to in conjunction with the valid character timer tests. Thus, the device is spurred into action by the transmission of an ordered set, which makes the valid character timer test more meaningful. Otherwise, the device may pass the valid character timer without ever sending any data out. In such a case the passing of the test would not be very meaningful, as it would not provide guidance as to the device's ability to behave itself properly once on the network. In practice, transmitting an ordered set is usually used in conjunction with the Receive Specific OS test discussed below.

Receive Specific Ordered Set. This test checks whether a specific predefined ordered set is received from the device. If the ordered set is received the test succeeds. If it hasn't, it fails. It is most commonly used in combination with the transmit a specific ordered set action. Thus, the device may be tested on whether it responds by sending a specific OS after it has received another specific OS.

Time to Complete Test. This test is usually used in conjunction with other tests. It measures the time all other tests currently running take to complete, and if any of them have not successfully completed before a predetermined time elapses, it fails. Otherwise it succeeds. If this test is used in conjunction with the valid character timer test, the valid character timer must be set for a shorter interval of time than the time to complete timer. Otherwise the valid character test will never complete before the time to complete timer expires and the device will always fail the time to complete timer test.

Check for Ordered Set Set (OS Set). Note that here the word "set" is repeated. In other words this test refers to a set of ordered sets. This test is similar to the received specific ordered set test but it differs in that instead of checking for a single ordered set, it checks whether the device transmits every single member of a predefined group (or set) of ordered sets. If the device transmits every ordered set the test is successful, otherwise it fails.

In the preferred embodiment this test may not be used in conjunction with the transmit an ordered set action and the received a specific ordered set test. In the preferred embodiment the set of ordered sets includes the following FC-AL ordered sets—{CLS, ARE, SOF, EOF, IDLE, LIP}. However the set of ordered sets used for this test may be configured by the user as a test parameter in a manner as discussed above. This test is preferably performed in conjunction with the time to complete test. This requires that the device transmit all OSs of the OS set during a limited time in order to pass the test. Otherwise, the test may never terminate.

It is also preferred that the device be connected in loopback mode for this test. This is because when the device transmits a certain OS from the OS set, looping that OS back to the device may cause the device to transmit another OS from the OS set.

There are various ways in which the above tests may be implemented. It is preferred that the tests are performed with as great parallelization as possible. In other words, the tests are preferably implemented so that multiple tests are performed concurrently. This ensures a short testing time as well as allows some tests to benefit from the device behavior caused by other tests. For example, one may configure the switch to perform the check for OS set test. However, additional benefit may be obtained if the check for CRCs test is also enabled. That is because while the device may be sending correct ordered sets, it may be using a cyclic redundancy check scheme that is not supported by the network the switch is positioned at. Thus, the two tests performed in parallel may in combination discover incompatibilities which would not be discovered if the check for OS set test was performed independently.

As discussed above, customization is an important aspect of the preferred embodiment of the present invention. Therefore, the suggestion that the tests are run in parallel does not imply that all the tests must be run. Instead, the tests are to be selectively turned on or off based on the configuration of the switch.

FIGS. 9 through 12 show a single flow chart describing an exemplary algorithm for performing the above tests concurrently. The algorithm described in these figures is performed either by the switch or the switch 300 in combination with the host 320.

In order to perform the below described algorithm, the switch must be able to send data to the device and receive data from the device. The switch (or the host connected to it) also stores received data in a buffer where it can be analyzed multiple times in connection with each test.

Figure 9:
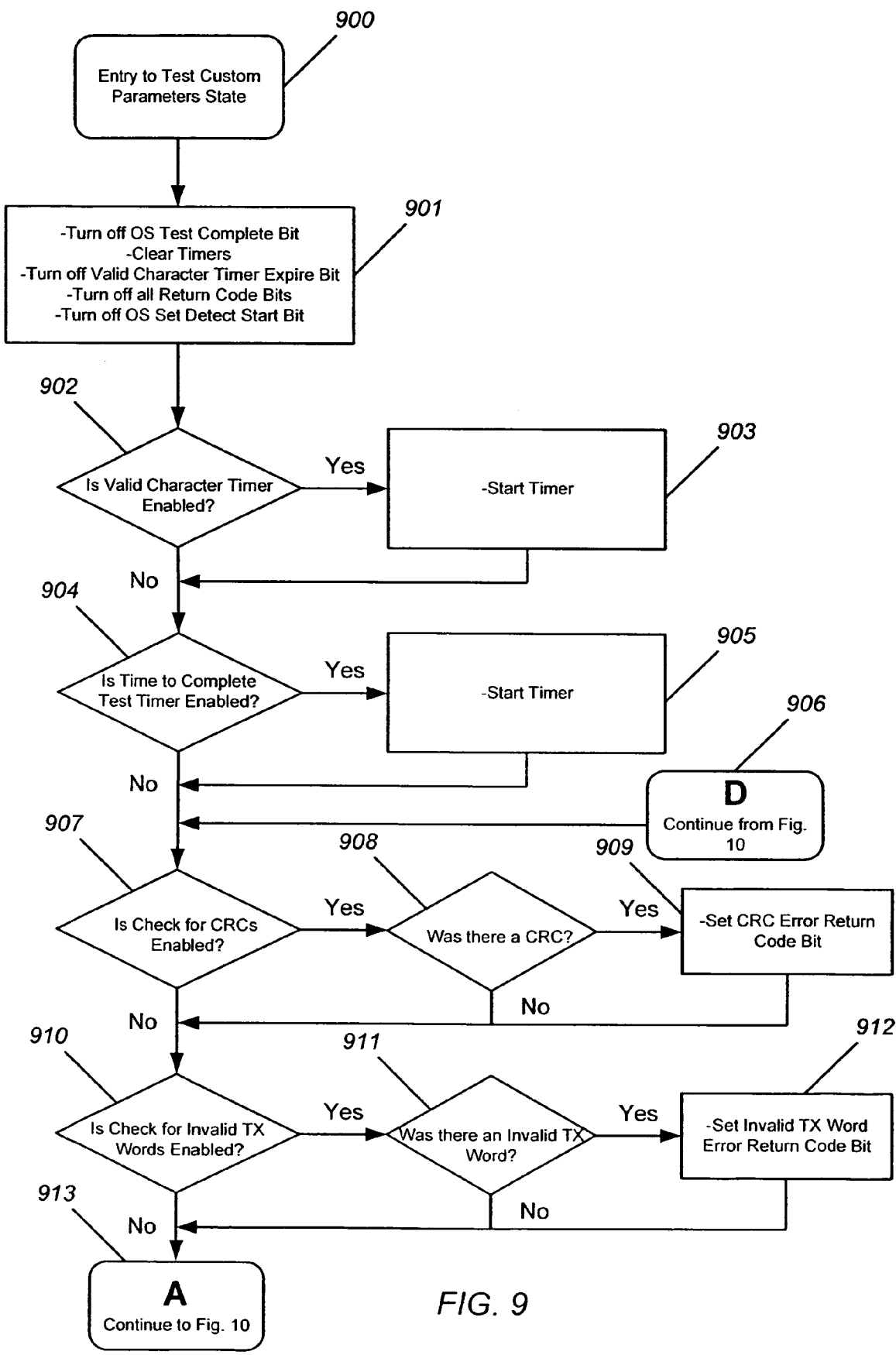
FIG. 9 is a first part of a flow chart describing an exemplary algorithm for performing a plurality of customizable tests.

Referring to FIG. 9, at step 900, the switch enters the test custom parameters state. At step 901, various variables are initialized. A test OS complete bit is turned off. This bit signifies whether a check for OS set test has been completed. Timers are also cleared. Timers store elapsed time and expire when the elapsed time reaches a particular limit. Usually two of them are used, one for the valid character timer test and one for the time to complete test. A valid character timer expire bit is also turned off. It signifies whether the valid character timer has expired. An OS Set detect bit is also turned off. This bit signifies whether the check for OS set test has been initiated.

For each test there is a return code bit. The return code bit signifies whether the test has been passed or failed. Usually a "1" or a set bit signifies that the test has failed. Since no tests have yet failed at the initialization stage, all return code bits are turned off at step 901.

At steps 902 and 903 a valid character timer is started if the valid character timer test is enabled. Otherwise, the timer is not started. Similarly a time to complete test timer is started if the time to complete test is enabled.

At step 907; it is determined whether the check for CRC errors test is enabled. If that is the case the buffer of data received from the device is checked to determine whether a CRC error is present (step 908). There are various known ways to check for CRC errors depending on which CRC scheme is used. If there is a CRC error, a CRC error return code bit is set (step 909). Otherwise, execution proceeds directly to step 910.

At step 910 it is determined whether the check for invalid TX words is enabled. If that is the case, it is determined whether any word in the buffer is an invalid TX word, i.e. it is a 10 bit word that does not have an 8 bit equivalent according to established FC-AL protocols (step; 911). If that is the case, an invalid TX word error return code bit is set (step 912). Otherwise, execution proceeds directly to step 913.

Figure 10:
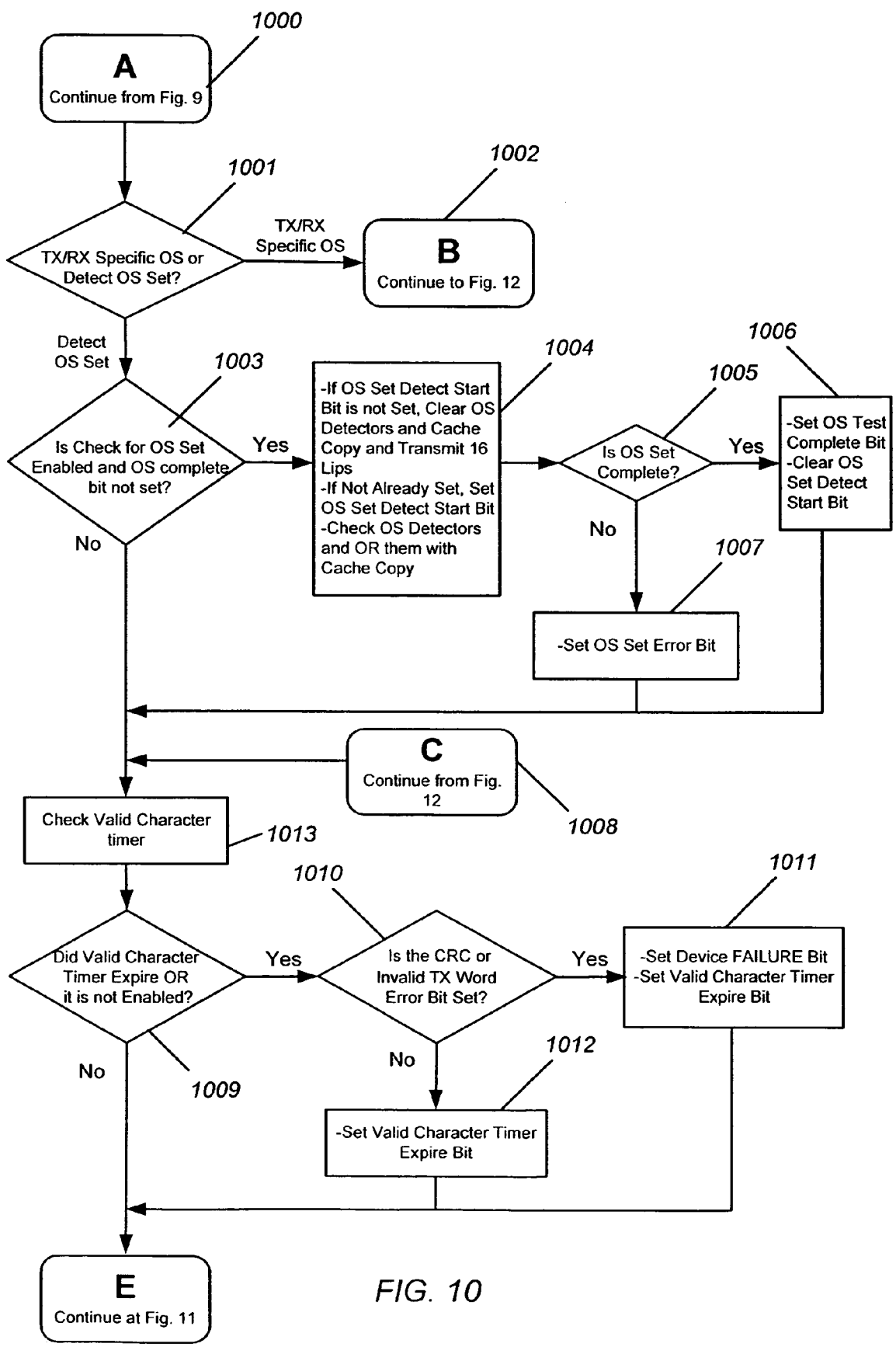
FIG. 10 is a second part of the flow chart describing an exemplary algorithm for performing a plurality of customizable tests.

Execution flow continues from point A (element 913) of FIG. 9 to point A (element 1000) of FIG. 10. At step 1001 it is determined whether at least one of two tests is enabled. These are the transmit a specific OS and receive a specific OS tests. If one of the tests is enabled, execution proceeds to FIG. 12 at point B (1002). Note that in the preferred embodiment, if one of these tests is enabled, than the check for OS set test will not be enabled.

At step 1003, it is determined whether the check for OS set test is enabled. Preferably, in this step it is also checked whether the detect OS set test has been completed by checking whether the OS set test complete bit is set. If the test is enabled and not completed, then execution proceeds to step 1004, where the check for OS set test is performed.

In order to perform the detect OS set test, the switch must monitor the output of the tested device and determine which (if any) members of the OS set have been emitted by the tested device. This is preferably performed by using a plurality of OS detectors. The OS detectors are hardware circuits within the switch which detect whether particular OSs have been sent by the tested device. Together the OS detectors emit a byte referred to as an OS detector byte wherein each bit is associated with a particular OS within the OS set. A set bit signifies that the associated OS was detected. A cache detector byte is used to save previous states of the OS detectors. If the OS set includes more than 8 OSs the string of bits may accordingly be longer than a byte and the cache detector byte may be a cache detector word, or an even bigger binary data structure.

Figure 13:
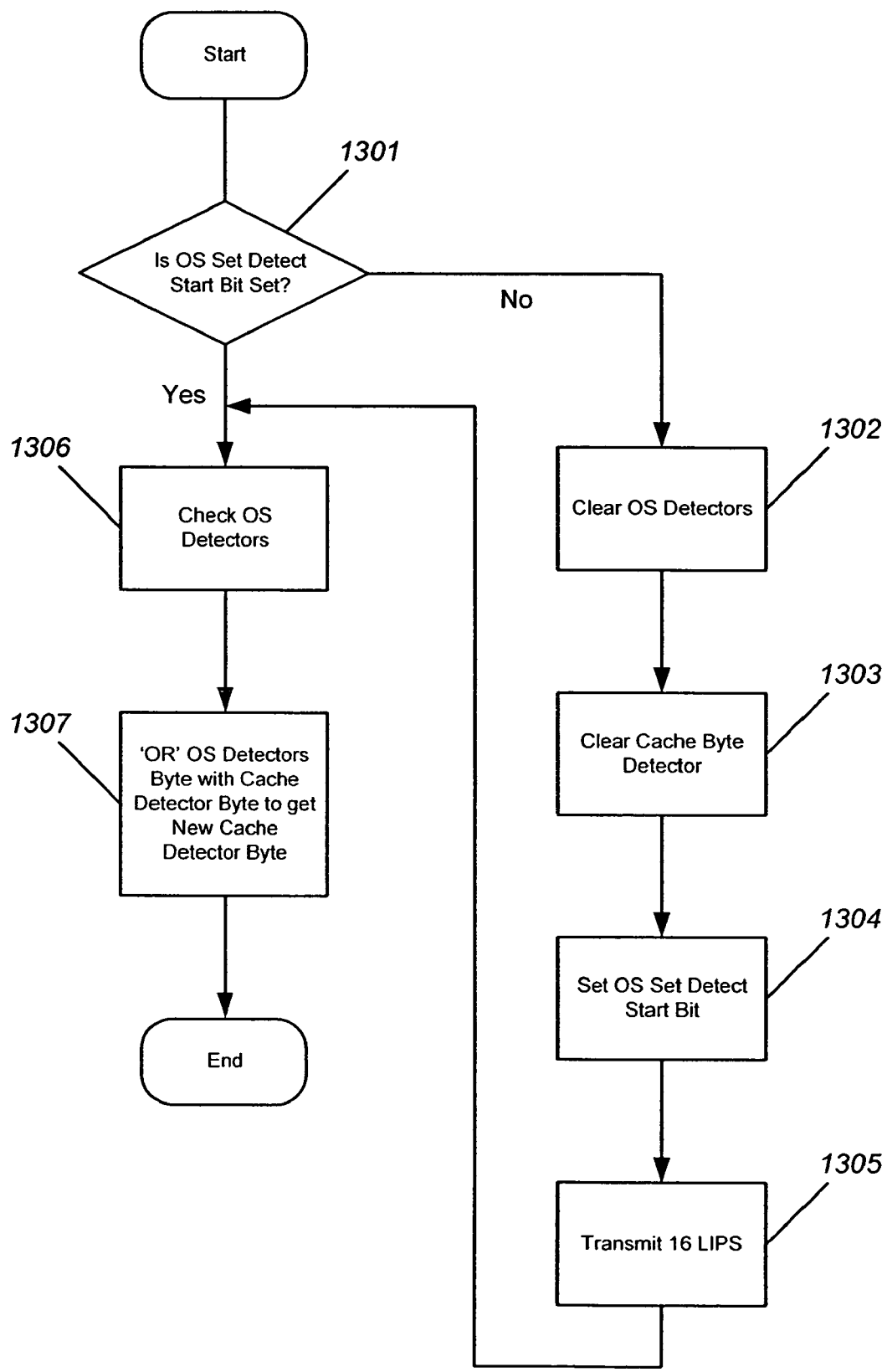
FIG. 13 is a diagram of the detect OS set test.

FIG. 13 describes the process performed in step 1004 in more detail. At step 1301 it is determined whether the OS set detect start bit is set. This bit signifies whether the OS set test has already started or whether this is the initial run. If the bit is not set, execution flows to steps 1302-1305 where initialization functions are performed. In step 1302 the OS detectors are cleared. In step 1304 the Os set detect start bit is set. In step 1305, 16 consecutive LIP sets are sent to the tested device. A LIP is an ordered set that initiates initialization of an FC-AL network. The 16 LIPs are sent in order to urge the tested device into action. The tested device should then start transmitting ordered sets which can be detected and analyzed for the detect OS set test. Note that it is preferable that the tested device is connected in loopback mode for this test. Therefore, each OS sent by the tested device will return back to the tested device may serve as a trigger for the tested device to send additional ordered sets.

At step 1306 the OS detectors are checked. This usually means that a byte or a word or a larger sequence of bits which signifies the current status of the OS detectors is extracted. In an alternative embodiment the switch may not use hardware OS detectors but check for OS sets based on the buffer. In other words the switch (or the host) may search through the buffer of received data to check which OS sets are present, and based on this create a byte analogous to the OS detector byte.

At step 1307 the current state of the detectors is saved into the cache detector byte. This is performed by executing an 'OR' operation of the OS detector byte and the cache detector byte to obtain a new cache detector byte. Thus, the cache detector byte will include '1' bits at every position which corresponds to an OS which has been detected by the OS detectors.

Thus, step 1004 has been described in relation to FIG. 13. Referring back to FIG. 10, at step 1005 it is determined whether the detect OS set test is complete. The test is complete when all OSs of the OS set have been detected. In the preferred embodiment, this is signified by a cache detector byte which includes all '1's. If the test is complete, an OS test complete bit is set, and the OS Set Detect start bit is cleared (step 1006). Note that the OS test complete bit is shared between both the detect an OS set and receive a specific OS set tests. Thus, it is set if either of these tests successfully completes. Also, if an OS set error bit has been previously set, it is reset. This is done because the OS set error bit may have been set in a previous iteration of steps 1003-1005, 1007. But while the OS set may not have been completed previously, new OSs received since the previous iteration may have completed the OS set, and therefore, an OS Set error no longer exists. If the test is not complete, an OS Set error bit is set (step 1007).

At step 1013 the valid character timer value is checked. At step 1009 it is determined whether a Valid Character Timer bit has expired or it is not enabled. If that is the case, it means that the timer has expired, and if any invalid character has been received up to this point, the device will fail the test. Alternatively, if the valid character timer is not enabled, then any CRC or invalid TX word error would still signify device failure. Therefore, at step 1010 it is determined whether the CRC error bit or the Invalid TX word error bit is set. If that is the case, the device has failed, and in step 1011 a device failure bit is set, and a valid character timer expire bit is also set. Otherwise, at step 1012 only the valid character timer expire bit is set.

Figure 11:
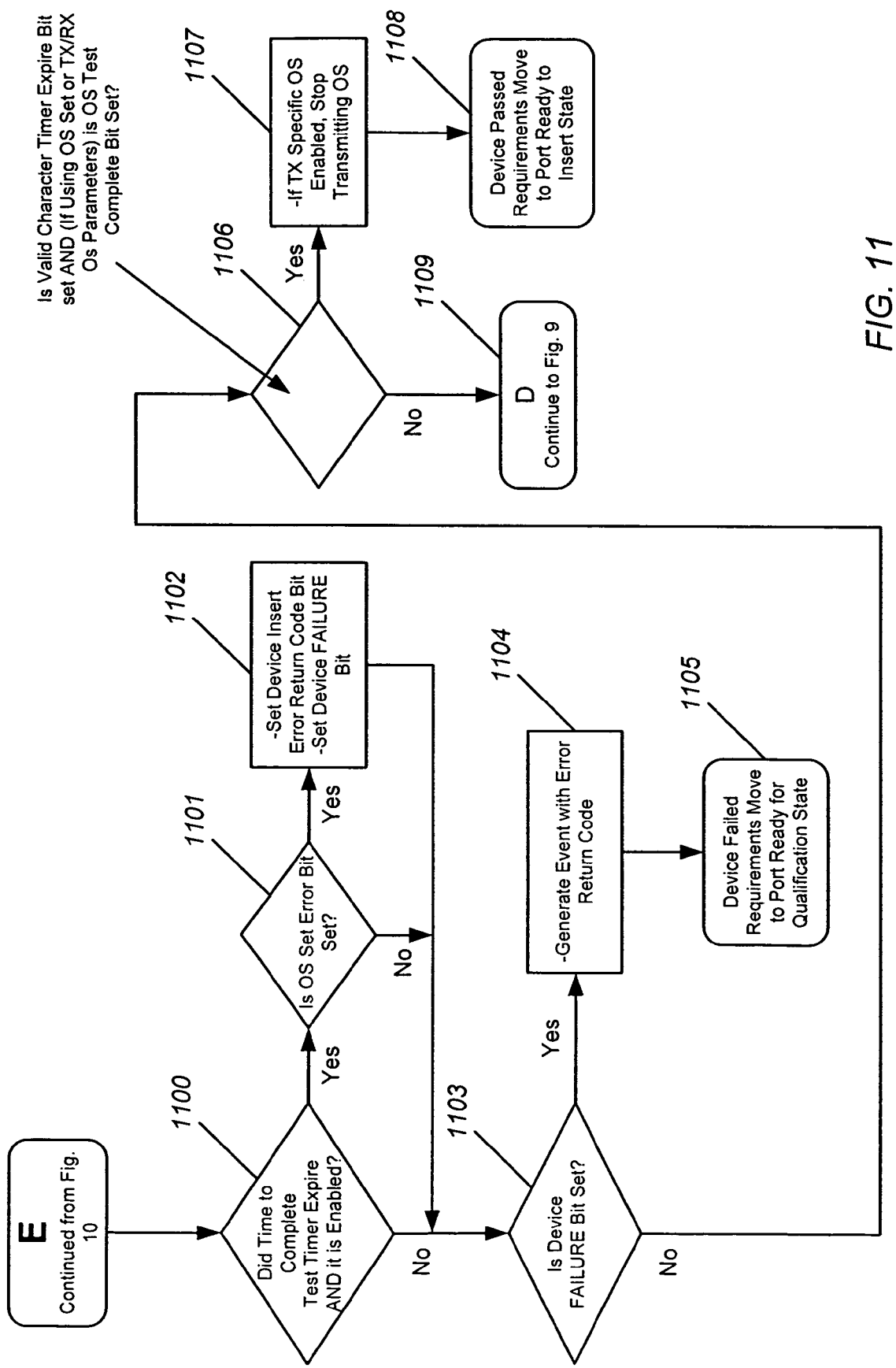
FIG. 11 is a third part of the flow chart describing an exemplary algorithm for performing a plurality of customizable tests.

The execution flow of FIG. 10 continues from point 'E' (element 1013) to point 'E' of FIG. 11 (element 1110). Referring to FIG. 11, at step 1100 it is determined whether the time to complete timer expired and whether it is enabled. If both of the latter are true, then execution proceeds to step 1101. There it is determined whether the detect OS set error bit is set. If that is the case, the device has failed, because the detect OS set test or the detect a specific OS test has not completed before the time to complete timer expires. Therefore, the Device failure bit is set at step 1102. Additionally a device insert error return code bit is also set.

At step 1103 it is determined if the device failure bit is set. If that is the case, then the device has failed the test. Thus, at step 1104, an event with an error return code is generated. The error return code depends on the various bits that signify the status of each test, such as the device insert error return code bit, CRC error return code bit, Invalid TX word error return code bit, etc. At step 1105, it is determined that the device has failed the test and the switch is placed in the Ready for Qualification state 704 (see FIG. 7) so another test may be performed, if required.

If the device failure bit is not set, then the device has not failed yet and execution proceeds to step 1106. At step 1106 it is determined whether the valid character timer expire bit is set and if either of the detect an OS set or receive a specific OS tests are enabled, and whether the OS test complete bit is set. If this is the case, then the device has successfully passed the existing tests. This is the case because reaching step 1106 signifies that the device failure bit is not set. If the valid character timer expires without the device failure bit being set that means that there have been no CRC or Invalid TX word failures. Furthermore, if the OS test complete bit is set, that means that there have been no failures in the detect an OS set or receive a specific OS tests.

After the device is deemed to have successfully completed the tests, sending OSs in order to monitor the device's response is no longer necessary. Therefore, if transmit specific OS is enabled, transmission of that OS is seized at step 1107. At step 1108, it is determined that the device has passed the requirements and the switch is placed in the port ready to insert state 707 (see FIG. 7)

If the condition of step 1106 is not satisfied than the device has neither passed nor failed the tests. Therefore, further testing is required. Thus execution continues from point 'D' of FIG. 11 (element 1109) to point 'D' of FIG. 9 (element 906). Thus, a cycle of the present flow chart is completed and another is initiated. The test will continue for as many cycles as necessary to determine a failure or a success of the device.

Figure 12:
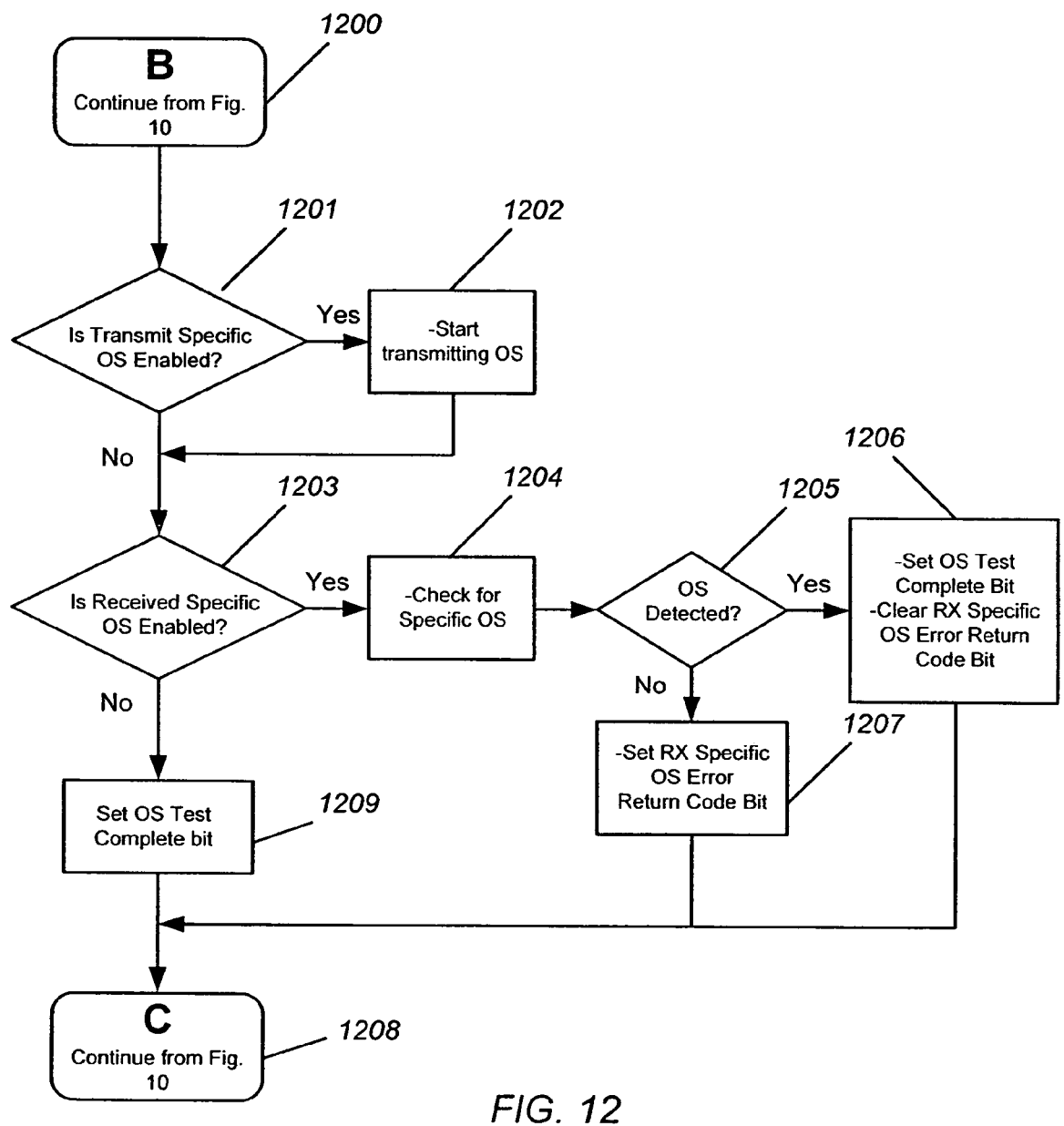
FIG. 12 is the final fourth part of the flow chart describing an exemplary algorithm for performing a plurality of customizable tests.

Referring to FIG. 12 the transmit an OS action and the receive a specific OS set are described in more detail. The execution enters the flow chart of FIG. 12 if at step 1001 it is determined that either the transmit an OS or receive a specific OS tests are enabled. If that is the case, execution continues from point 'B' of FIG. 10 (element 1002) to point B of FIG. 12 (element 1200).

At step 1201 it is determined whether the transmit a specific OS action is enabled. If that is the case, transmitting the OS is initiated at step 1202 and continues at regular intervals until such transmission is stopped at step 1107 (FIG. 11) or the device fails.

At step 1203 it is determined whether the receive a specific OS test is enabled. If that is the case, the buffer is searched at step 1204 to determine whether a predefined OS has been detected as sent from the device. At step 1205 it is determined whether such OS has in fact been detected. If that is the case, the OS test complete bit is set at step 1206. Also, a receive a specific OS error return code bit is cleared (reset) if it was previously set. That is due to the fact that this bit may have been set during a previous iteration of steps 1205 and 1207, when the specific OS was not received. But since the specific OS has been received at the current iteration, an error no longer exists and the error bit should be cleared.

If the OS is not detected a receive specific OS error return code bit is set at step 1207.

At step 1203, if Receive Specific OS enabled is not set, then the OS test complete bit is set (item 1209 in FIG. 12)

Execution proceeds from point 'C' of FIG. 12 (element 1208) to point 'C' of FIG. 10 (element 1008).

It must be noted that the process of FIGS. 9-13 is provided as an example of an algorithm for selectively performing a plurality of tests. A person of skill in the art may find that the present invention may be used to perform other tests, or the same tests in a different fashion. Furthermore, a person of skill in the art will find that the present invention may be used to perform tests that are defined by the user, as discussed above.

One skilled in the art may devise many alternative configurations for the systems and methods disclosed herein. Therefore, it should be understood that the present invention may be embodied in many other specific forms without departing from the spirit or scope of the invention and that the present examples are to be considered as illustrative and not restrictive. Thus, the invention is not to be limited to the details given herein. It may encompass any embodiments within the scope of the claims below.

What is claimed as new and desired to be protected by Letters Patent of the United States is:

1. A system comprising:
   a plurality of ports, two or more of which are connectable to respective devices; and
   a dedicated networking element connected to the plurality of ports and comprising a plurality of data channels for connecting one or more of the respective devices in a loop based network,
   the system being configurable to provide customized tests for testing the respective devices when inserting the respective devices into said network having a particular type amongst respective types, wherein the customized tests are provided by allowing a user to select, according to the particular type of said network, one or more tests from a plurality of tests to be used as the customized tests for determining whether one of said respective devices is suitable for said particular type of said network.

2. The system of claim 1 being further configurable to:
   allow a user to insert a new device into the system; and
   perform the selected one or more tests upon the new device.

3. The system of claim 2 being further configurable to:
   connect the new device to the network after the selected one or more tests have been successfully performed.

4. The system of claim 1, wherein the dedicated networking element is a switch.

5. The system of claim 4, wherein the loop based network is an FC-AL network and the switch is an FC-AL switch.

6. The system of claim 1, wherein the loop based network is a storage area network.

7. The system of claim 1, further comprising a host connected to the dedicated networking element for controlling and monitoring the dedicated networking element.

8. The system of claim 7, wherein the host comprises a processor and a memory, and the memory comprises instructions executable by the processor which, when executed, cause the host and the dedicated networking element to execute each of the selected tests.

9. The system of claim 8, wherein the instructions are modifiable by the user in order to select the one or more tests from the plurality of tests.

10. The system of claim 8, wherein the instructions, when executed, cause the host to display a user interface, through which the user may select the selected tests.

11. The system of claim 2, wherein the selected tests are performed concurrently.

12. The system of claim 11, wherein the plurality of tests include one or more of the following: a valid character timer test, a check for cyclic redundancy check errors test, a receive a specific ordered set test, a time to complete test, and a check for a complete ordered set (OS) set test.

13. The system of claim 1, wherein the user is allowed to select from one or more actions, and the selected actions are performed by the system concurrently with the selected tests.

14. The system of claim 13 wherein the one or more actions comprises a transmit an ordered set action.

15. The system of claim 3 wherein the dedicated networking element is configurable to place the port that the new device is connected to selectively in loopback or in non-loopback mode depending on the selected tests.

16. A system comprising:
   a plurality of ports, two or more of which are connectable to respective devices; and
   a dedicated networking element connected to the plurality of ports and comprising a plurality of data channels for connecting one or more of the respective devices in a loop based network,
   the system being configurable to provide customized tests for testing the respective devices when inserting the respective devices into said network having a particular type amongst respective types, wherein the customized tests are provided by allowing a user to define, according to the particular type of said network, one or more tests to be used as the customized tests for determining whether one of said respective devices is suitable for said particular type of said network.

17. The system of claim 16 being further configurable to:
   allow a user to insert a new device into the system; and
   perform the defined test upon the new device.

18. The system of claim 17 being further configurable to connect the new device to the network after the defined test has been successfully performed.

19. The system of claim 18, further comprising a host connected to the dedicated networking element for controlling and monitoring the dedicated networking element and wherein the host comprises a processor and a memory, and the memory comprises instructions executable by the processor which, when executed, cause the host to control the dedicated networking element, wherein the instructions are modifiable by the user in order to define the defined test.

20. The system of claim 18, further comprising a host connected to the dedicated networking element for controlling and monitoring the dedicated networking element and wherein the host comprises a processor and a memory, and the memory comprises instructions executable by the processor which, when executed, cause the host to control the dedicated networking element and cause the host to provide a user interface, through which the user may define the defined test.

21. A method for inserting a new device into a loop based network having one or more devices connected to the network, said network having a particular type amongst respective types, the method comprising providing customized tests for testing the new device before inserting the new device into said network, wherein the customized tests are provided by:
   defining a plurality of tests for determining whether the new device is suitable for the respective types of loop based networks; and
   allowing a user to select, according to the particular type of said network, one or more of the plurality of tests to be used as the customized tests for determining whether the new device is suitable for said particular type of said network.

22. The method of claim 21, further comprising:
   allowing a user to insert the new device into a system for managing the loop based network; and
   performing the selected tests on the new device.

23. The method of claim 22 further comprising connecting the new device to the loop based network after the selected tests have been satisfactorily performed.

24. The method of claim 21, wherein the loop based network is an FC-AL network.

25. The method of claim 21, wherein the loop based network is a storage area network.

26. The method of claim 21, wherein the selected tests are performed concurrently.

27. The method of claim 21, wherein allowing the user to select one or more tests includes allowing the user to manipulate a source code for performing the method, to compile the source code, and to execute the source code.

28. The method of claim 21, wherein allowing the user to select one or more tests includes allowing the user to interact with a user interface to select the tests.

29. The method of claim 21, further including placing a port that the new device is connected to in loopback mode.

30. The method of claim 29 further including placing the port the new device is connected to in non-loopback mode.

31. The method of claim 21, wherein the plurality of tests include one or more of the following: a valid character timer test, a check for cyclic redundancy check errors test, a receive a specific ordered set test, a time to complete test, and a check for a complete ordered set (OS) set test.

32. The method of claim 21, wherein the user is further allowed to select one or more actions and the selected actions are performed concurrently with the selected tests.

33. The method of claim 32 wherein the selected actions include a transmit an ordered set action.

34. A method for inserting a new device into a loop based network having one or more devices connected to the network, said network having a particular type amongst respective types, the method comprising:
   providing customized tests for testing the new device before inserting the device into said network, wherein the customized tests are provided by allowing a user to define, according to the particular type of said network, a test for determining whether the new device is suitable for said particular type of said network; and
   performing the defined test on the new device.

35. The method of claim 34 further comprising connecting the new device to the loop based network after the defined test has been satisfactorily performed.

36. The method of claim 34 further comprising allowing a user to insert the new device into a system for managing the loop based network.

37. The method of claim 34, wherein allowing the user to define a test includes allowing the user to manipulate a source code for performing the method, to compile the source code, and to execute the source code.

38. The method of claim 34, wherein allowing the user to define a test includes allowing the user to interact with a user interface.

39. A computer readable storage medium storing a computer program for controlling a dedicated networking device in order to insert a new device into a loop based network having a particular type amongst respective types, the loop based network being facilitated through the dedicated networking device and having one or more devices connected to the network, the computer program comprising computer executable instructions which, when executed by a computer, cause the computer to provide customized tests for testing the new device before inserting the new device into said network, wherein the customized tests are provided by:
   defining a plurality of tests for determining whether the new device is suitable for the respective types of loop based networks; and
   allowing a user to select, according to the particular type of said network, one or more of the plurality of tests for determining whether the new device is suitable for said particular type of said network.

40. The computer readable storage medium of claim 39 wherein the computer program further includes computer executable instructions which, when executed by the computer, cause the computer to:
   allow a user to insert the new device into a system for managing the loop based network; and perform the selected tests on the new device.

41. The computer readable storage medium of claim 40 wherein the computer program further includes computer executable instructions which, when executed by the computer, cause the computer to:
   connect the new device to the loop based network, after the selected tests have been satisfactorily performed.

42. The computer readable storage medium of claim 41 wherein the computer program is configured for execution at a host connected to the dedicated networking device.

43. The computer readable storage medium of claim 41 wherein the computer program is configured for execution at the dedicated networking device.

44. The computer readable storage medium of claim 39, wherein the dedicated networking device is a switch.

45. The computer readable storage medium of claim 39, wherein the loop based network is an FC-AL network.

46. The computer readable storage medium of claim 39, wherein the loop based network is a storage area network.

47. The computer readable storage medium of claim 39, wherein the selected tests are performed concurrently.

48. The computer readable storage medium of claim 39, wherein the computer program further includes computer executable instructions which, when executed by the computer, cause the computer to implement a user interface for allowing the user to select one or more tests.

49. The computer readable storage medium of claim 39, wherein the computer program further includes computer executable instructions which, when executed by the computer, cause the computer to place a port that the new device is connected to in loopback mode.

50. The computer readable storage medium of claim 49, wherein the computer program further includes computer executable instructions which, when executed by the computer, cause the computer to place the port that the new device is connected to in non-loopback mode.

51. The computer readable storage medium of claim 39, wherein the plurality of tests include one or more of the following: a valid character timer test, a check for cyclic redundancy check errors test, a receive a specific ordered set test, a time to complete test, and a check for a complete ordered set (OS) set test.

52. The computer readable storage medium of claim 39, wherein the computer program further includes computer executable instructions which, when executed by the computer, cause the computer to:
   define one or more actions;
   allow the user to select one or more selected actions from the one or more actions; and
   perform the selected actions concurrently with the selected tests.

53. The computer readable storage medium of claim 52 wherein the selected actions include a transmit an ordered set action.

54. A computer readable storage medium storing a computer program for controlling a dedicated networking device in order to insert a new device into a loop based network having a particular type amongst respective types, the loop based network being facilitated through the dedicated networking device and having one or more devices connected to the network, the computer program comprising computer executable instructions which, when executed by a computer, cause the computer to:

provide customized tests for testing the new device before inserting the new device into said network, wherein the customized tests are provided by allowing a user to define, according to the particular type of said network, a test for determining whether the new device is suitable for said particular type of said network; and perform the defined test on the new device.

55. The computer readable storage medium of claim 54, wherein the computer program further includes computer executable instructions which, when executed by the computer, cause the computer to:

allow a user to insert the new device into a system for managing the loop based network; and after the defined test has been satisfactorily performed on the new device, connect the new device to the loop based network.

56. The computer readable storage medium of claim 55, wherein the computer program further includes computer executable instructions which, when executed by the computer, cause the computer to define a user interface and allowing the user to define a test includes allowing the user to interact with the user interface.

57. A computer readable storage medium storing a computer program for controlling a dedicated networking device in order to insert a new device into a loop based network having a particular type amongst respective types, the loop based network being facilitated through the dedicated networking device and having one or more devices connected to the network, the computer program comprising computer executable instructions which, when executed by a computer, cause the computer to:

define a plurality of tests for determining whether the new device is suitable for the respective types of loop based networks;

provide customized tests for testing the new device before inserting the new device into said network by allowing a user to select one or more tests of the plurality of tests to be used as the customized tests for determining whether the new device is suitable for said particular type of the network; and perform the selected one or more tests on the new device, wherein the one or more tests selected from the plurality of tests are determined by modifications of the computer program made by a user.

58. The computer readable storage medium of claim 57, wherein the computer program further comprises computer executable instructions which, when executed by the computer, cause the computer to:

allow a user to insert the new device into a system for managing the loop based network; and after the selected tests have been satisfactorily performed on the new device, connect the new device to the loop based network.

* * * * *